No. 677,158. Patented June 25, 1901.
J. KOENIG.
COMB FILING TOOL.
(Application filed Oct. 8, 1900.)
(No Model.)

Witnesses:
Leo W. Young
N. E. Oliphant

Inventor
Joseph Koenig
By H. G. Underwood
Attorney

UNITED STATES PATENT OFFICE.

JOSEPH KOENIG, OF TWO RIVERS, WISCONSIN.

COMB-FILING TOOL.

SPECIFICATION forming part of Letters Patent No. 677,158, dated June 25, 1901.

Application filed October 8, 1900. Serial No. 32,377. (No model.)

*To all whom it may concern:*

Be it known that I, JOSEPH KOENIG, a citizen of the United States, and a resident of Two Rivers, in the county of Manitowoc and State of Wisconsin, have invented certain new and useful Improvements in Comb-Filing Machines; and I do hereby declare that the following is a full, clear, and exact description thereof.

My invention has for its object to facilitate and cheapen the manufacture of combs, especially aluminium toilet combs; and it consists in certain peculiarities of construction and combination of parts hereinafter particularly set forth with reference to the accompanying drawings and subsequently claimed.

Figure 1:
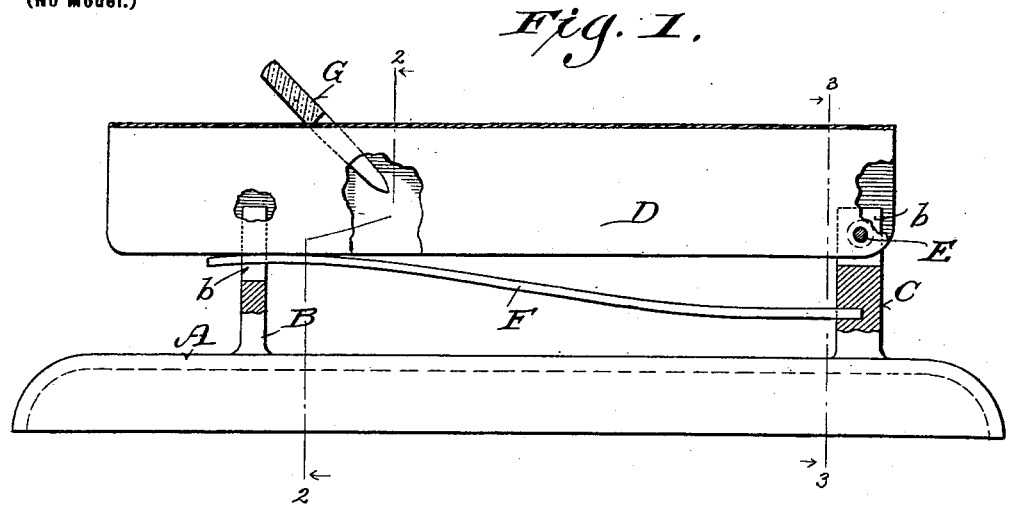
Figure 2:
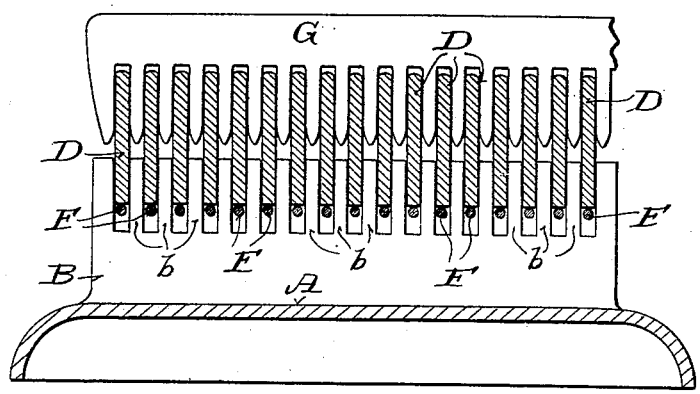
Figure 3:
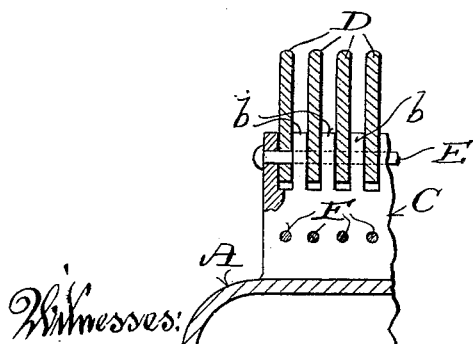

Figure 1 of the drawings represents a side elevation of a comb-filing tool in accordance with my invention; Fig. 2, a transverse section of the tool, indicated by line 2 2 in the preceding figure; and Fig. 3, another transverse section of said tool, indicated by line 3 3 in the first figure.

Referring by letter to the drawings, A indicates a base, and rising from this base, near its ends, are transverse standards B C, each of which has the upper portion thereof vertically recessed at intervals to thereby form spacers $b$, the recesses being engaged by the lower portions of blades in the form of plates D, that are set edgewise and have their upper exposed edges file-cut similar to floats or grails employed by comb-makers.

The file-blades are shown supported in the recesses of standard C by a pivot-pin E, and spring-rods F, shown in connection with said standard, extend back in the recesses of standard B to form yielding supports for the free ends of said blades, the latter being guided in said standards. The spacing of the file-blades corresponds to the spacing of the teeth of combs to be filed, and in practice the comb-teeth are inserted between said blades as far as the cuts between teeth will permit. A comb G, positioned on the tool, is held in slanting position and reciprocated by the operator, whereby the file-edges of the blades are caused to reduce the sharp edges that occur at the upper ends of the cuts between the comb-teeth. As the blades have independent yielding resistance to a comb under pressure thereon, they automatically accommodate themselves to depth of cuts between comb-teeth, the exposed file-edge of each blade being effective in proportion to the tension of its spring-support.

By employment of the tool herein set forth I economize time and labor in the manufacture of combs by substituting a gang of file-blades for a single float or grail, and while I have shown one practical form of improved comb-filing tool it may be more or less varied in matters of structural detail without departure from my invention.

Having thus described my invention, what I claim as new, and desire to secure by Letters Patent, is—

1. A comb-filing tool comprising a series of spring-resisted file-edge blades spaced apart to correspond to intervals between the comb-teeth.

2. A comb-filing tool comprising a plurality of standards having their upper portions vertically recessed at intervals in a transverse direction, and file-edge blades engaging the recesses of all the standards.

3. A comb-filing tool comprising a standard having its upper portion vertically recessed at intervals in a transverse direction, file-edge blades in the recesses, and spring-supports for the blades.

4. A comb-filing tool comprising a base, a pair of standards rising from the base and having their upper portions vertically recessed at intervals in a transverse direction, file-edge blades having pivot union with one of the standards in the recesses thereof, and spring-supports for the free ends of the blades.

In testimony that I claim the foregoing I have hereunto set my hand, at Two Rivers, in the county of Manitowoc and State of Wisconsin, in the presence of two witnesses.

JOSEPH KOENIG.

Witnesses:
W. J. WRIETH,
J. F. MAGEE.